United States Patent [19]

Takagi et al.

[11] Patent Number: 4,560,413
[45] Date of Patent: Dec. 24, 1985

[54] GAMMA-DICALCIUM SILICATE-CONTAINING CEMENT COMPOSITION

[75] Inventors: Shigehide Takagi; Norio Yokota, both of Narashino; Syohei Sato, Funabashi; Toshihiro Nishi, Narashino, all of Japan

[73] Assignee: Sumitomo Cement Co., Ltd., Tokoyo, Japan

[21] Appl. No.: 612,299

[22] Filed: May 21, 1984

[30] Foreign Application Priority Data

May 30, 1983 [JP] Japan .................................. 58-94031

[51] Int. Cl.⁴ ................................................ C04B 7/34
[52] U.S. Cl. ..................................... 106/120; 106/118; 106/119; 106/315
[58] Field of Search ........... 106/90, 314, 315, 118–120

[56] References Cited

U.S. PATENT DOCUMENTS 3,998,773 12/1976 Crinkelmeyer ................... 106/90 X
4,028,126  6/1977 Mori et al. ........................... 106/100
4,111,710  9/1978 Pairaudeau et al. .................. 106/90
4,118,227 10/1978 Shiohara et al. ................ 106/120 X
4,410,366 10/1983 Birchall et al. ...................... 106/90

*Primary Examiner*—William R. Dixon, Jr.
*Assistant Examiner*—Steven Capella
*Attorney, Agent, or Firm*—Armstrong, Nikaido, Marmelstein & Kubovcik

[57] ABSTRACT

A hardened cement material having enhanced flexural strength, heat resistance, and water resistance prepared from a cement composition comprising 100 parts by weight of a hydraulic cement material containing $\gamma$-dicalcium silicate ($\gamma$-$C_2S$) preferably in an amount of 1% by weight or more and 1 to 20 parts by weight of a water-dispersible polymeric material, and mixed with 5 to 25 parts by weight of water, by a molding procedure and by a heat-hardening procedure at a temperature of from 40° C. to 180° C. while controlling the relative humidity to 20% to 70% and/or applying a pressure of 5 to 15 atmospheres.

12 Claims, 2 Drawing Figures

GAMMA-DICALCIUM SILICATE-CONTAINING CEMENT COMPOSITION

BACKGROUND OF THE INVENTION

1. Field of the Invention

The present invention relates to a γ-dicalcium silicate-containing cement composition. More particularly, the present invention relates to a γ-dicalcium silicate-containing cement composition, an aqueous cement mixture containing the cement composition, and a hardened cement material prepared from the aqueous cement mixture and having enhanced flexural strength, water resistance, and heat resistance.

2. Description of the Prior Art

Conventional cement products obtained by hydraulically hardening conventional cement compositions do not always exhibit high flexural strength. That is, when conventional products are produced from conventional cement compositions, wherein the cement particles have a usual size at a usual water/cement ratio, the products exhibit flexural strength of a level of approximately 5 to 10 MPa.

It is known that the flexural strength of cement products can be increased by mixing a fiber material into the cement composition. However, even if fiber material is added, it is difficult to attain a flexural strength of the resultant cement products exceeding 40 MPa. Addition of the fiber material also results in decreased fluidity and moldability of the cement composition.

Other approaches to enhance the flexural strength of cement products have been to control the size and amount of pores formed in the cement products or to regulate the viscosity conditions of the cement composition. However, it is known that while cement products prepared in accordance with the above-mentioned methods have enhanced flexural strength, they are unsatisfactory in flame resistance (heat resistance and fire resistance) and water resistance and, therefore, are useless in practice.

In addition, since conventional cement compositions contain, as a major component, Portland cement or another hydraulic cement, the resultant cement products are undesirably discolored gray and, therefore, have a poor appearance.

SUMMARY OF THE INVENTION

An object of the present invention is to provide a cement composition containing γ-dicalcium silicate, an aqueous cement mixture containing the cement composition, and a hardened cement product prepared from the aqueous cement mixture and having high flexural strength, heat resistance, and water resistance.

The above-mentioned object can be attained by the present invention.

That is, the cement composition of the present invention comprises 100 parts by weight of a hydraulic cement material containing γ-dicalcium silicate (γ-$C_2S$) and 1 to 20 parts by weight of a water-dispersible polymeric material.

The aqueous cement mixture of the present invention comprises the above-mentioned cement composition mixed with 5 to 25 parts by weight of water per 100 parts by weight of the hydraulic cement material.

The hardened cement material of the present invention is prepared from the above-mentioned aqueous cement mixture.

The γ-dicalcium silicate is prepared in such a manner that at least one calcium compound selected from the group consisting of calcium oxide, calcium hydroxide, and calcium carbonate, each having a degree of purity of 95% by weight or more, is mixed with a silicon material having a degree of purity of 99% by weight or more in a molar ratio of the calcium compound in terms of calcium oxide (CaO) to the silicon material in terms of silicon dioxide ($SiO_2$), of 1.90:1 to 2.05:1; the resultant mixture is calcined at a temperature of from 1,000° C. to 1,500° C. for 30 minutes to 3 hours; and then the calcined product is gradually cooled to the ambient air temperature.

DESCRIPTION OF THE PREFERRED EMBODIMENTS

The cement composition of the present invention comprises 100 parts by weight of a hydraulic cement material and 1 to 20 parts by weight of a water-dispersible polymeric material.

The hydraulic cement material contains γ-dicalcium silicate (γ-$C_2S$), preferably in an amount of 60% by weight or more. The γ-dicalcium silicate-containing hydraulic cement material preferably consists of γ-dicalcium silicate alone.

γ-dicalcium silicate is useful as cement particles for the cement composition of the present invention. It had been believed that since γ-dicalcium silicate exhibits no hydraulic property, it is preferable that the content of the γ-dicalcium silicate as a cement component in the cement composition be as small as possible. Surprisingly, the inventors of the present invention have discovered that when γ-dicalcium silicate powder is kneaded together with a water-dispersible polymeric material and water and the kneaded aqueous mixture is heat-treated at a low humidity condition or under a high pressure condition, the kneaded mixture is satisfactorily hydraulically hardened and the resultant hardened cement product exhibits enhanced flexural strength, water resistance, and heat resistance.

When a mixture of a γ-dicalcium silicate-containing cement composition of the present invention with water is hydraulically hardened, the γ-dicalcium silicate is hydrated in an initial stage of the hardening process to form a tobermorite-like hydration product (CSH) in the form of a gel. The hydration product (CSH) of the γ-dicalcium silicate is mixed with and stabilized by the water-dispersible polymeric material to form a stable matrix phase. Grains of the non-hydrated γ-dicalcium silicate and a filler are embedded in the matrix phase consisting of a mixture of the hydrated γ-dicalcium silicate and the water-dispersible polymeric material.

Figure 1:
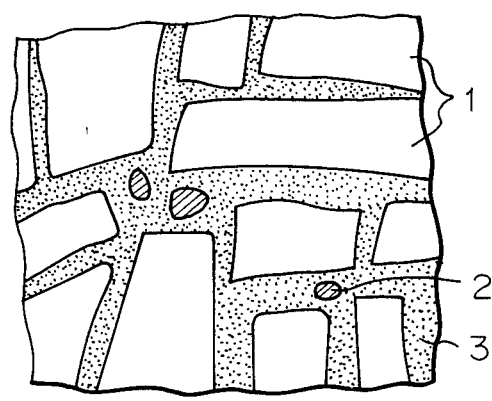
FIG. 1 is an explanatory view of a structure of a hardened cement material of the present invention and FIG. 2 is an explanatory view of a structure of a conventional hardened cement material.

That is, the hardened cement material of the present invention has a stable matrix phase and, therefore, exhibits enhanced mechanical strength, including flexural strength, and improved water resistance, heat resistance, flame resistance, and dimensional stability. Referring to FIG. 1, in the structure of the hardened cement material of the present invention, non-hydrated γ-dicalcium silicate grains 1 and filler grains 2 are embedded within a matrix phase 3 consisting of a mixture of a hydrated γ-dicalcium silicate (CSH) gel and a water-dispersible polymeric material.

Figure 2:
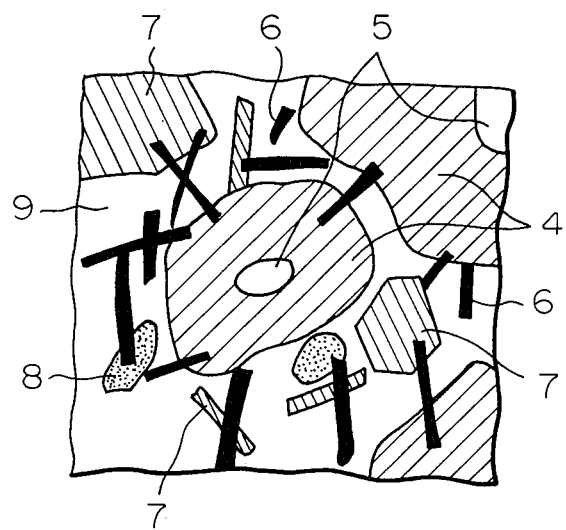

Referring to FIG. 2 showing an internal structure of a conventional hardened Portland cement material, particles 5 of non-hydrated Portland cement are embedded within internal hydrated Portland cement grains 4. They are distributed together with external hydrated Portland cement grains 6, calcium hydroxide grains 7 and additive particles 8 at random in a matrix 9 consisting of a hydration product of calcium silicate in the form a gel (CHS gel).

The hydraulic cement material to be contained in the cement composition of the present invention may consist of γ-dicalcium silicate alone or may contain an additional cement material, preferably in an amount of 40% by weight or less, in addition to γ-dicalcium silicate.

The additional cement material comprises at least one hydraulic cement material selected from, for example, the group consisting of Portland cement; mixed Portland cements, for example, blast furnace cement, fly ash cement, and silica cement; alumina cement; hydraulic line; Roman cement; natural cement; mixed line cements, for example, slag cement and pozzolaric cement; rapid hardening cements; superrapid hardening cements; and oil well cements. Especially, since alumina cement per se is converted to a hardened cement material having high flexural strength, it is preferable that alumina cement be used as the additional cement material to be mixed with the γ-dicalcium silicate.

In the cement composition of the present invention, the hydraulic cement material is mixed with a water-dispersible polymeric material which serves as a lubricant and dispersant for the hydraulic cement material particles and is effective for enhancing fluidity, plasticity, and moldability of the resultant cement composition and for stabilizing the matrix phase in the hardened cement material.

The water-dispersible polymeric material may comprise at least one member selected from the group consisting of vinyl acetate homopolymer and copolymers; amide polymers, for example, acrylamide homopolymer and copolymers and methacrylamide homopolymer and copolymers; non-ionic alkyl cellulose esters and hydroxyalkyl cellulose esters, for example, hydroxypropylmethyl cellulose and oxypropylmethyl cellulose; polyalkylene oxide polymer derivatives for example, polyethylene oxide; polyalkoxyl polymer derivatives; and sulfonic acid group-containing polymers, for example, lignosulfonate and sulfonated naphthalene salts.

The water-dispersible polymeric material is mixed in an amount of 1 to 20 parts by weight, preferably 1 to 5 parts by weight, with 100 parts by weight of the hydraulic cement material.

The cement composition of the present invention can be mixed with an additive, for example, a fine aggregate or filler. The additive is preferably in the form of fine particles having a size of 1 mm or less. That is, the additive may comprise at least one member selected from the group consisting of silica materials, for example, sand, quartz sand, and fine amorphous silica, titania, olivine, slate flour, fly ash, slag, and gypsum.

The cement composition of the present invention can form a hardened cement material without using a reinforcing fiber material. However, the cement composition of the present invention may be mixed with a reinforcing fiber material, if desired. Also, the cement composition of the present invention may be mixed with a coloring matter, for example, pigment. That is, since the γ-dicalcium silicate powder is white, the hardened cement material is also white. Therefore, the cement composition of the present invention can be mixed with coloring matter so the resultant hardened cement material exhibits a brilliant color.

The γ-dicalcium silicate to be used for the cement composition of the present invention can be produced in such a manner that at least one calcium compound selected from the group consisting of calcium oxide, calcium hydroxide, and calcium carbonate, each having a degree of purity of 99% by weight or more, is mixed with a silica material containing 99% by weight or more of silicon dioxide in a molar ratio of the calcium compound in terms of calcium oxide (CaO) to the silica material in terms of silicon dioxide ($SiO_2$) of from 1.90:1 to 2.05:1, preferably, 1.98:1; the resultant mixture is calcined at a temperature of from 1,000° C. to 1,500° C., preferably from 1350° C. to 1450° C., more preferably, 1400° C.; and the calcined product is gradually cooled to the ambient air temperature.

The calcium compound is selected from quick lime (calcium oxide), slaked lime (calcium hydroxide), and calcium carbonate. The silica material is selected from silica stone, silica sand, and high purity siliceous materials produced as industrial by-products.

The calcium compound and the silica material must have a degree of purity of 99% or more, respectively. That is, both the calcium compound and the silica material must be free from 0.5% by weight or more of $Al_2O_3$, 0.1% by weight or more of $Fe_2O_3$, 0.57% by weight or more of MgO, 0.2% by weight or more of $TiO_2$, 0.3% by weight or more of $B_2O_3$, 0.3% by weight or more of $P_2O_5$, 0.3% by weight or more of $Na_2O$, 0.3% by weight or more of $K_2O$, and 0.3% by weight or more of $As_2O_5$.

In the production of the γ-dicalcium silicate (γ-$C_2S$), the calcium compound and the silica material are preferably in the form of fine particles having a specific surface area of 1500 $cm^2/g$ or more determined by the Blain permeability method and a size of 0.1 mm or less, respectively.

After the mixture of the calcium compound and the silica material is calcined at a temperature of 1000° C. to 1500° C., the resultant calcined product is gradually cooled. In the cooling procedure, the cooling rate from about 500° C. to the ambient air temperature is preferably 15° C./min or less, more preferably, 10° C./min or less.

When the calcining procedure is completed, the resultant dicalcium silicate has a β-crystalline structure. During the gradual cooling procedure, a polymorphic transition of the β-crystalline structure to γ-crystalline structure occurs. The resultant γ-dicalcium silicate is in the form of fine particles having a size of 0.5 to 100 microns. That is, the polymorphic transition of the β-crystalline structure to the γ-crystalline structure causes an increase in the volume of the dicalcium silicate crystals. This phenomenon results in pulverization of the dicalcium silicate crystals. Therefore, when the above-mentioned method is applied, the resultant γ-dicalcium silicate particles can be directly used for the cement composition of the present invention without pulverizing the particles. This feature of the γ-dicalcium silicate is highly advantageous in decreasing the cost for producing the cement composition of the present invention.

In the production of a hardened cement material, an aqueous cement mixture is prepared by mixing the cement composition of the present invention with water in an amount of 5 to 25 parts by weight, preferably, 7 to 15 parts by weight, per 100 parts by weight of the hydraulic cement material. That is, the amount of water to be mixed is restricted to a relatively small value. This restriction is effective for controlling the hydrating rate of the cement composition to a low-level and for obtaining a hardened cement material having a high density and a low porosity.

In the preparation of the aqueous cement mixture containing a relatively small amount of water, the mixture of the cement composition with water is kneaded by a two-screw-type kneader, a two-roll mill, or a combination of the above-mentioned kneader and mill, under a high shear stress.

The resultant aqueous cement mixture of the present invention may be molded to a desired form by means of a conventional molding or shaping method, for example, extrusion, rolling (sheet-forming), and pressing (rod-forming, cone-forming, and irregular form-forming) methods. The molded (shaped) product may be further processed by means of mechanical processing, for example, cutting, to provide a half-finished product in the desired form.

The aqueous cement mixture of the present invention per se or in the form of the half-finished product can be stored for a long period of time while maintaining the plasticity of the aqueous cement mixture at a satisfactory level by completely sealing it from the ambient atmosphere.

The molded product of the aqueous cement mixture of the present invention, which may be just prepared or just unsealed after a certain period of storage, is hardened at a temperature of from 40° C. to 180° C., preferably 80° C. to 150° C., while controlling the relative humidity to from 20% to 70%, preferably from 20% to 60%, and/or applying a pressure of from 5 to 15 atmospheres, preferably, from 5 to 10 atmospheres. Under the above-mentioned specific hardening conditions, the aqueous cement mixture of the present invention containing $\gamma$-dicalcium silicate particles can be satisfactorily hardened in spite of the fact that the $\gamma$-dicalcium silicate particles have substantially no hydraulic property under usual hardening conditions.

The hardened cement material of the present invention exhibits enhanced flexural strength. However, the flexural strength can be further enhanced by controlling the porosity and size of pores formed in the hardened cement material to desired values, in accordance with a method disclosed, for example, in Japanese Unexamined Patent Publication (Kokai) No. 56-14465. For example, the porosity and size of the pores are adjusted to such an extent that the total volume of the pores having a size of 100 microns or more, 50 microns or more, or 15 microns or more, does not exceed 2% or 0.5% of the entire volume of the hardened cement material.

Generally, the flexural strength of the hardened cement material increases with a decrease in the total volume of pores having a large size.

The high density hardened cement material having high flexural strength can be obtained by controlling the distribution of the size of the hydraulic cement material particles to a specific mode. That is, it is preferable that the distribution curve of the particle size of the hydraulic cement material have a plurality of peak points.

For example, in a two-peak-point mode of particle size distribution, the hydraulic cement material contains (a) 50% by weight or more, preferably, from 70% to 90% by weight, of particles having a size of from 60 to 110 microns, (b) 5% by weight or more, preferably, 10% to 50% by weight, of particles having a size of from 1 to 10 microns, and (c) 20% by weight or less, preferably, 10% by weight or less, more preferably 5% by weight or less, of particles having other sizes than the above.

The distribution mode of the particle size may be of a three-peak-point mode or of a single-peak-point mode.

Generally, the $\gamma$-dicalcium silicate particles prepared by the above-mentioned method have a preferable mode of particle size distribution and, therefore, are highly effective for producing the high density hardened cement material of the present invention.

In the selection of the components to be used for the cement composition of the present invention, it is important that when a cement composition containing the selected components is subjected to a capillary rheometer test, the composition exhibit a certain level or more of increase in shear stress with increase in shearing speed. In this connection, Japanese Unexamined Patent Publication (Kokai) No. 57-129853 should be referred to.

For example, the flexural strength of the hardened cement material can be enhanced by selecting the type of components and the composition of the cement composition so that when the composition is extruded by the capillary rheometer, an increase in the shearing speed in the range of from 0.1 to 5 second to ten times the original shearing speed, results in an increase of a level of 25% or more in the shearing stress of the composition.

The above-mentioned method for increasing the flexural strength is known for conventional hardened hydraulic cement compositions. However, this method is also effective for the hardened cement composition of the present invention. That is, by utilizing the above-mentioned method, it is possible to obtain a hardened cement material of the present invention having a flexural strength of 200 MPa or more and a high Young's modulus.

As is apparent from the above description, in accordance with the present invention, there can be obtained a hardened cement material having a remarkably improved flexural strength (at least 50 MPa) as compared with the conventional hardened cement material. Furthermore, the hardened cement material of the present invention is able to attain a low porosity, a high Young's modulus, and a high fracture energy. In addition, the hardened cement material of the present invention has no disadvantage such that the hardened hydraulic cement products having high flexural strength exhibit poor water resistance and flame resistance. Also, since the hardened cement material of the present invention is white, it exhibits an excellent appearance and can be readily colored. Moreover, since the $\gamma$-dicalcium silicate powder used in the cement composition can be obtained in the form of finely divided particles without applying any mechanical pulverizing procedure, the cost of production is low, and, thus, the cost of the cement composition containing such $\gamma$-dicalcium silicate powder is low.

Because of these features, the cement composition of the present invention can be widely used as general building materials and substitute materials for plastics, ceramics, and non-ferrous and ferrous materials, including sealing materials, electrical parts, and rims or wheel caps of vehicle tires.

The following specific examples are presented for the purpose of clarifying the present invention. However, it should be understood that those examples are intended only to illustrate the present invention and are not intended to limit the scope of the present invention in any way.

EXAMPLE 1

A mixture was prepared from 100 parts by weight of quick lime powder (particle size of 0.1 mm or less) and 54 parts by weight of a powdered siliceous material (particle size of 0.1 mm). These powders contained, as impurities, on a weight basis, not more than 0.10% of $Al_2O_3$, not more than 0.05% of $Fe_2O_3$, not more than 0.20% of MgO, not more than 0.05% of $TiO_2$, not more than 0.02% of $B_2O_3$, not more than 0.02% of $P_2O_5$, not more than 0.05% of $Na_2O$, not more than 0.05% of $K_2O$, and not more than 0.02% of $Al_2O_3$ and other impurities. The powdery mixture was calcined in an electrical furnace at a temperature of about 1400° C. for 2 hours and, then, was gradually cooled. Gradual cooling from 500° C. to room temperature was carried out at a cooling rate of 10° C./min.

After the gradual cooling, there were obtained white powders having a particle size of 0.3 to 95 microns which were confirmed to comprise $\gamma$-dicalcium silicate by means of X-ray analysis.

The resultant $\gamma$-dicalcium silicate powder had a degree of purity of 98% and a specific surface area of 1500 $cm^2/g$ determined by the Blain permeability method and contained 0.04% by weight of particles having a size of 88 microns or more, 1.57% by weight of particles having a size of 63 microns or more, 4.47% by weight of particles having a size of 44 microns or more, 30.28% by weight of particles having a size of 30 microns or more, 58.07% by weight of particles having a size of 20 microns or more, and 72.44% by weight of particles having a size of 15 microns or more.

EXAMPLE 2

An aqueous cement mixture was prepared by mixing 100 parts by weight of the $\gamma$-$C_2S$ powder prepared in Example 1 with 5 parts by weight of polyvinyl acetate (the degree of saponification is 78.5% to 81.5%) and 12 parts by weight of pure water. The mixture was premixed in a Hobard mixer and, then, was kneaded by using a two-roll mill to obtain a sheet-formed aqueous cement mixture. The sheet-formed mixture was maintained under a pressure of 30 $kg/cm^2$ for 10 minutes to form a specimen having a thickness of 3 mm, a length of 200 mm, and a width of 150 mm. The specimen was immediately transferred into a constant temperature and humidity vessel conditioned to a relative humidity of 45% and a temperature of 100° C. and was heat-treated for one hour to harden it.

The physical property values of the hardened specimen were as follows. The bending strength was determined by an Instron universal testing machine using a test specimen having a width of 5 cm and a span of 10 cm. The heat flexural strength of the above-mentioned test speciment was determined after it was retained at a temperature of 300° C. for 1 hour. The water absorption and the rate of change of length were determined by saturating the specimen with water and then by absolutely drying the specimen at a temperature of 105° C. The changes in the weight and length of the specimen were measured. The flame retardance was measured by determining whether or not the specimen passed the noncombustible material test of the Japanese Ministry of Construction in accordance to Japanese Industrial Standard (JIS) A1321.
Flexural strength: 750 $kg/cm^2$ (73.5 MPa)
Heat flexural strength: 715 $kg/cm^2$
Water absorption: 0.5%
Rate of change of length: 0.05%
Flame retardance: Passing noncombustible material test

EXAMPLE 3

An aqueous cement mixture was prepared by mixing 100 parts by weight of a hydraulic cement material consisting of 95 wt. % of $\gamma$-dicalcium silicate powder and 5 wt. % of talc with 7 parts by weight of polyacrylamide and 15 parts by weight of pure water. The resultant mixture was subjected to the same kneading, molding, heat-treatment, and testing procedures as those described in Example 2. The results were as follows.
Flexural strength: 680 $kg/cm^2$ (73.5 MPa)
Heat flexural strength: 635 $kg/cm^2$
Water absorption: 0.75%
Rate of change of length: 0.07%
Flame retardance: Passed noncombustible material test

EXAMPLE 4

A specimen obtained by the same kneading and molding procedures as those described in Example 2 was placed in a polyethylene bag and was completely sealed. After the lapse of 6 months, the cement composition withdrawn from the polyethylene bag exhibited satisfactory plasticity and mechanical processability. This cement composition was subjected to the same heat-treatment and testing procedures as those described in Example 2. The following results were obtained.
Flexural strength: 712 $kg/cm^2$ (69.8 MPa)
Heat flexural strength: 679 $kg/cm^2$
Water absorption: 0.6%
Rate of change of length: 0.06%
Flame retardance: Passed noncombustible material test

EXAMPLE 5

An aqueous cement mixture was prepared by mixing 100 parts by weight of the $\gamma$-$C_2S$ powder prepared in Example 1 with 7 parts by weight of the same polyvinyl acetate as that described in Example 2 and 11 parts by weight of water. A specimen was produced from the aqueous cement mixture in the same manner as that described in Example 2.

The specimen was heated at a heating rate of 2° C./min to a temperature of 120° C. and maintained at this temperature at a relative humidity of 40% under a pressure of 10 $kg/cm^2$ for one hour to harden it. The hardened specimen was gradually cooled.

The hardened specimen exhibited the following properties.
Flexural strength: 825 $kg/cm^2$
Heat flexural strength: 804 $kg/cm^2$
Water absorption: 0.4%
Rate of change of length: 0.03%
Flame retardance: Passing noncombustible material test

EXAMPLE 6

The same procedures as those described in Example 5 were carried out except that the heat-treatment for the specimen was carried out under a pressure of 15 kg/cm². The resultant hardened specimen exhibited the following properties.

Flexural strength: 866 kg/cm²
Heat flexural strength: 853 kg/cm²
Water absorption: 0.2%
Rate of change of length: 0.02%
Flame retardance: Passing noncombustible material test

We claim:

1. A cement composition comprising 100 parts by weight of a hydraulic cement material containing at least 60% by weight of γ-dicalcium silicate (γ-$C_2S$) and 1 to 20 parts by weight of a water-dispersible polymeric material.

2. The cement composition as claimed in claim 1, wherein said hydraulic cement material contains 40% by weight or less of an additional cement material.

3. The cement composition as claimed in claim 2, wherein the additional cement material is an alumina cement.

4. The cement composition as claimed in claim 1, wherein said hydraulic cement material consists of γ-dicalcium silicate alone.

5. The cement composition as claimed in claim 1, wherein said water-dispersible polymeric material comprises at least one member selected from the group consisting of vinyl acetate homopolymer and copolymers; acrylamide homopolymer and copolymers; methacrylamide homopolymer and copolymers; non-ionic alkyl cellulose esters; non-ionic hydroxyalkyl cellulose esters; polyalkylene oxide polymer derivatives; polyalkoxyl polymer derivatives; and sulfonic acid group-containing polymers.

6. The cement composition as claimed in claim 1, wherein said γ-dicalcium silicate is one produced in such a manner that at least one calcium compound selected from the group consisting of calcium oxide, calcium hydroxide, and calcium carbonate, each having a degree of purity of 99% by weight or more, is mixed with a silica material having a degree of purity of 99% by weight or more in a molar ratio of said calcium compound in terms of calcium oxide (CaO) to said silica material in terms of silicon dioxide ($SiO_2$) of 1.90:1 to 2.05:1; the resultant mixture is calcined at a temperature of from 1,000° C. to 1,500° C. for 30 minutes to 3 hours; and then the calcined product is gradually cooled to ambient air temperature.

7. An aqueous cement mixture comprising said cement composition as claimed in claim 1 mixed with 5 to 25 parts by weight of water per 100 parts by weight of said hydraulic cement material.

8. The aqueous cement mixture as claimed in claim 7, which is molded into a desired form.

9. The aqueous cement mixture as claimed in claim 7, which is sealed from the ambient air atmosphere.

10. The aqueous cement mixture as claimed in claim 8, which is sealed from the ambient air atmosphere.

11. A hardened cement material prepared from the aqueous cement mixture as claimed in claim 7.

12. The hardened cement material as claimed in claim 11, which is one prepared by molding said aqueous cement mixture into a desired form, and by heating said molded aqueous cement mixture at a temperature of 40° C. to 180° C., and at a relative humidity of from 20% to 70% and/or under a pressure of 5 to 15 atmospheres.

* * * * *